United States Patent
Ramachandran et al.

(10) Patent No.: US 11,689,414 B2
(45) Date of Patent: Jun. 27, 2023

(54) ACCESSING GATEWAY MANAGEMENT CONSOLE

(71) Applicant: INTERNATIONAL BUSINESS MACHINES CORPORATION, Armonk, NY (US)

(72) Inventors: Puthukode G. Ramachandran, Austin, TX (US); John C. Sanchez, Pflugerville, TX (US); Zhennan Wang, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 416 days.

(21) Appl. No.: 15/809,348

(22) Filed: Nov. 10, 2017

(65) Prior Publication Data

US 2019/0149402 A1 May 16, 2019

(51) Int. Cl.
*H04L 41/0806* (2022.01)
*H04L 67/00* (2022.01)
(Continued)

(52) U.S. Cl.
CPC .......... *H04L 41/0806* (2013.01); *H04L 12/66* (2013.01); *H04L 61/103* (2013.01);
(Continued)

(58) Field of Classification Search
CPC . H04L 61/15–1594; H04L 61/00–6095; H04L 12/66; H04L 41/08–0803;
(Continued)

(56) References Cited

U.S. PATENT DOCUMENTS 6,735,617 B1 * 5/2004 Goodman ......... H04L 29/06027
358/402
7,376,650 B1 * 5/2008 Ruhlen ................. G06F 16/955
(Continued)

FOREIGN PATENT DOCUMENTS

CN      102281251 A    12/2011
CN      102340527 A     2/2012
(Continued)

OTHER PUBLICATIONS

Q. Zhu, R. Wang, Q. Chen, Y. Liu and W. Qin, "IOT Gateway: BridgingWireless Sensor Networks into Internet of Things," 2010 IEEE/IFIP International Conference on Embedded and Ubiquitous Computing, Hong Kong, 2010, pp. 347-352, doi: 10.1109/EUC.2010.58. (Year: 2010).*

(Continued)

*Primary Examiner* — Glenton B Burgess
*Assistant Examiner* — Julian Chang
(74) *Attorney, Agent, or Firm* — Cantor Colburn LLP; Brian Welle

(57) ABSTRACT

Technical solutions are described for configuring a gateway in an internet of things (IoT) system. An example method includes receiving, by a gateway resolver, a request to access a management console of the IoT system, the request including access information associated with the gateway of the IoT system, the request being sent by an administration device. The method further includes determining, by the gateway resolver, an IP address of the gateway based on the access information. The method further includes obtaining, by the gateway resolver, a management console URL based on the IP address. The method further includes redirecting, by the gateway resolver, the administration device to the management console URL in response to the request.

13 Claims, 7 Drawing Sheets

(51) Int. Cl.
| | |
|---|---|
| *H04L 61/103* | (2022.01) |
| *H04L 61/45* | (2022.01) |
| *H04L 61/5007* | (2022.01) |
| *H04L 67/63* | (2022.01) |
| *H04L 67/563* | (2022.01) |
| *H04L 61/5076* | (2022.01) |
| *H04L 12/66* | (2006.01) |
| *H04L 67/12* | (2022.01) |
| *H04L 67/146* | (2022.01) |
| *H04L 101/622* | (2022.01) |
| *H04L 9/40* | (2022.01) |

(52) U.S. Cl.
CPC ......... *H04L 61/45* (2022.05); *H04L 61/5007* (2022.05); *H04L 61/5076* (2022.05); *H04L 67/12* (2013.01); *H04L 67/146* (2013.01); *H04L 67/34* (2013.01); *H04L 67/563* (2022.05); *H04L 67/63* (2022.05); *H04L 63/101* (2013.01); *H04L 2101/622* (2022.05)

(58) Field of Classification Search
CPC ............. H04L 67/12–125; H04L 67/28; H04L 67/2814; H04L 67/34; H04L 61/25–2596; H04L 41/00–5096
See application file for complete search history.

(56) References Cited

U.S. PATENT DOCUMENTS

| | | | |
|---|---|---|---|
| 7,523,186 B1 | 4/2009 | Waters | |
| 7,603,408 B1 | 10/2009 | Mcginnis et al. | |
| 7,711,121 B2 | 5/2010 | Hunt et al. | |
| 7,921,686 B2 | 4/2011 | Bagepalli et al. | |
| 7,954,133 B2 | 5/2011 | Stavenow et al. | |
| 7,966,391 B2 | 6/2011 | Anderson et al. | |
| 8,050,282 B2* | 11/2011 | Cho ................... | H04L 12/2818 370/401 |
| 8,068,817 B1* | 11/2011 | Viswanath .......... | H04L 61/2596 455/414.1 |
| 8,184,641 B2 | 5/2012 | Alt et al. | |
| 8,220,037 B2 | 7/2012 | Snyder et al. | |
| 8,250,193 B2 | 8/2012 | Han | |
| 8,275,758 B2 | 9/2012 | Tanabe et al. | |
| 8,537,841 B2 | 9/2013 | Takeyoshi et al. | |
| 9,077,611 B2 | 7/2015 | Cordray et al. | |
| 9,172,553 B2 | 10/2015 | Dawes et al. | |
| 9,182,961 B1 | 11/2015 | Tolle | |
| 9,465,566 B2 | 10/2016 | Ishino et al. | |
| 9,692,892 B2 | 6/2017 | Jiang | |
| 10,079,839 B1* | 9/2018 | Bryan ................ | G06F 3/041 |
| 10,091,048 B2 | 10/2018 | Han et al. | |
| 10,171,286 B2 | 1/2019 | Seed et al. | |
| 10,190,791 B2 | 1/2019 | Jacobson et al. | |
| 10,257,159 B2 | 4/2019 | Kim | |
| 10,292,040 B2 | 5/2019 | Dubesset et al. | |
| 10,341,321 B2 | 7/2019 | Kumar et al. | |
| 10,379,842 B2 | 8/2019 | Malladi et al. | |
| 10,380,871 B2 | 8/2019 | Sundermeyer et al. | |
| 10,382,358 B1 | 8/2019 | Jain et al. | |
| 10,432,630 B2 | 10/2019 | Takemoto | |
| 11,102,073 B2 | 8/2021 | Horiuchi | |
| 2002/0106074 A1* | 8/2002 | Elliott ................ | H04M 19/041 379/372 |
| 2002/0146018 A1 | 10/2002 | Kailamaki et al. | |
| 2005/0058143 A1* | 3/2005 | Kikuchi ............. | H04L 12/2803 370/401 |
| 2005/0169288 A1* | 8/2005 | Kamiwada .......... | H04L 63/0272 370/466 |
| 2006/0045068 A1* | 3/2006 | Wu ..................... | H04L 61/2567 370/352 |
| 2007/0061129 A1 | 3/2007 | Barreiro | |
| 2007/0127507 A1* | 6/2007 | Aluf-Medina .... | H04L 29/06027 370/401 |
| 2008/0062977 A1* | 3/2008 | Kaneko ............... | H04L 12/2898 370/389 |
| 2009/0222541 A1* | 9/2009 | Monga ............... | H04L 29/12113 709/222 |
| 2010/0058160 A1* | 3/2010 | Navarro ............. | G06Q 10/0637 715/208 |
| 2010/0124228 A1* | 5/2010 | Tinnakornsrisuphap ................... H04L 12/66 370/392 |
| 2010/0262467 A1 | 10/2010 | Barnhill et al. | |
| 2011/0295942 A1* | 12/2011 | Raghunath ............. | H04L 45/00 709/203 |
| 2012/0023167 A1* | 1/2012 | Hovdal ................ | G06K 7/1095 709/204 |
| 2012/0059924 A1* | 3/2012 | Zhang ..................... | H04W 4/50 709/223 |
| 2012/0106488 A1* | 5/2012 | Nylander ........... | H04L 29/12066 370/329 |
| 2012/0178416 A1* | 7/2012 | Miklos ................. | H04L 61/3075 455/410 |
| 2012/0199647 A1* | 8/2012 | Hwang ................ | G06Q 10/087 235/375 |
| 2012/0207152 A1* | 8/2012 | Chang ................. | H04M 7/1255 370/356 |
| 2012/0219008 A1* | 8/2012 | Lee ..................... | H04L 12/2834 370/401 |
| 2013/0041997 A1 | 2/2013 | Li et al. | |
| 2013/0069781 A1* | 3/2013 | Terwilliger ......... | G06F 16/9554 340/539.13 |
| 2013/0069794 A1* | 3/2013 | Terwilliger ............. | G06Q 10/10 340/815.45 |
| 2013/0071029 A1* | 3/2013 | Terwilliger ............. | H04L 67/36 382/183 |
| 2013/0305345 A1* | 11/2013 | Bugenhagen ....... | H04L 61/1552 726/12 |
| 2013/0342865 A1* | 12/2013 | Shekher ............. | G06K 15/4045 358/1.14 |
| 2014/0004830 A1* | 1/2014 | McCann ............. | H04W 12/069 455/411 |
| 2014/0091135 A1* | 4/2014 | Burke, Jr. ............. | G06Q 10/20 235/375 |
| 2014/0092411 A1* | 4/2014 | Burke, Jr. .......... | G06Q 20/3276 358/1.13 |
| 2014/0244834 A1 | 8/2014 | Guedalia et al. | |
| 2014/0282991 A1* | 9/2014 | Watanabe ............... | G06F 21/34 726/9 |
| 2014/0334490 A1* | 11/2014 | Nakata ..................... | H04L 69/08 370/392 |
| 2014/0357187 A1* | 12/2014 | Ehrensvard ........... | H04L 63/123 455/41.1 |
| 2015/0002870 A1* | 1/2015 | Burke, Jr .............. | G06F 3/1204 358/1.13 |
| 2015/0106484 A1 | 4/2015 | Hui | |
| 2015/0371004 A1* | 12/2015 | Jones ................... | G06F 19/326 705/2 |
| 2015/0372971 A1* | 12/2015 | Hashimoto ............. | H04W 4/80 709/245 |
| 2016/0036764 A1 | 2/2016 | Dong et al. | |
| 2016/0057124 A1* | 2/2016 | Boyle .................. | H04W 12/08 726/7 |
| 2016/0070509 A1* | 3/2016 | Takahira ............. | H04N 1/00307 358/1.15 |
| 2016/0112861 A1* | 4/2016 | Qu ....................... | H04L 61/1511 455/432.1 |
| 2016/0127226 A1* | 5/2016 | Bays .................... | H04L 49/206 370/389 |
| 2016/0128043 A1* | 5/2016 | Shuman ............... | H04W 72/044 370/331 |
| 2016/0142433 A1* | 5/2016 | Nasu ...................... | H04L 63/20 726/25 |
| 2016/0165432 A1 | 6/2016 | Dubesset et al. | |
| 2016/0239733 A1* | 8/2016 | Hertz ...................... | H04W 4/12 |
| 2016/0270020 A1 | 9/2016 | Adrangi ................. | H04L 67/02 |
| 2016/0301598 A1* | 10/2016 | Strijkers ............... | G06F 9/5072 |
| 2016/0308875 A1* | 10/2016 | Judge ................... | H04L 63/102 |
| 2016/0315915 A1* | 10/2016 | Byszio ................ | H04L 63/0435 |

(56) References Cited

U.S. PATENT DOCUMENTS

| | | | |
|---|---|---|---|
| 2016/0321459 A1* | 11/2016 | Byszio | H04L 67/02 |
| 2017/0054571 A1 | 2/2017 | Kitchen et al. | |
| 2017/0070361 A1 | 3/2017 | Sundermeyer et al. | |
| 2017/0078922 A1 | 3/2017 | Raleigh et al. | |
| 2017/0094033 A1 | 3/2017 | Sathyadevan et al. | |
| 2017/0099647 A1 | 4/2017 | Shah et al. | |
| 2017/0105131 A1* | 4/2017 | Song | H04W 4/70 |
| 2017/0180198 A1 | 6/2017 | Baum et al. | |
| 2017/0180380 A1* | 6/2017 | Bagasra | H04L 63/10 |
| 2017/0187597 A1 | 6/2017 | Nolan et al. | |
| 2017/0187625 A1 | 6/2017 | Nolan et al. | |
| 2017/0187642 A1 | 6/2017 | Nolan et al. | |
| 2017/0215023 A1* | 7/2017 | Ly | H04W 4/70 |
| 2017/0237623 A1 | 8/2017 | Hopkins et al. | |
| 2017/0257257 A1 | 9/2017 | Dawes et al. | |
| 2017/0272930 A1 | 9/2017 | Jiang | |
| 2017/0289184 A1* | 10/2017 | C | H04L 63/1425 |
| 2017/0344703 A1 | 11/2017 | Ansari et al. | |
| 2018/0034914 A1 | 2/2018 | Christopher et al. | |
| 2018/0041856 A1 | 2/2018 | Lou et al. | |
| 2018/0048564 A1* | 2/2018 | Bianco | H04L 61/1511 |
| 2018/0075154 A1* | 3/2018 | Broselow | H04L 67/34 |
| 2018/0075156 A1* | 3/2018 | Broselow | G06K 7/10861 |
| 2018/0075397 A1 | 3/2018 | Ronen et al. | |
| 2018/0115554 A1 | 4/2018 | Dyon et al. | |
| 2018/0146361 A1 | 5/2018 | Jiang | |
| 2018/0159954 A1 | 6/2018 | Lu et al. | |
| 2018/0183653 A1 | 6/2018 | Chew et al. | |
| 2018/0227977 A1* | 8/2018 | Jin | H04W 60/005 |
| 2018/0234489 A1 | 8/2018 | Hammons et al. | |
| 2018/0262533 A1 | 9/2018 | Mccaig et al. | |
| 2018/0278607 A1* | 9/2018 | Loladia | H04W 4/70 |
| 2018/0288007 A1 | 10/2018 | Poornachandran et al. | |
| 2018/0316603 A1 | 11/2018 | Boucadair et al. | |
| 2018/0331997 A1* | 11/2018 | Mo | H04L 61/103 |
| 2019/0089597 A1 | 3/2019 | Pathak et al. | |
| 2019/0098113 A1 | 3/2019 | Park et al. | |
| 2019/0129706 A1 | 5/2019 | Vangeel et al. | |
| 2019/0132932 A1 | 5/2019 | Klecha et al. | |
| 2019/0149401 A1 | 5/2019 | Ramachandran et al. | |
| 2019/0149433 A1 | 5/2019 | Ramachandran et al. | |
| 2019/0158353 A1 | 5/2019 | Johnson et al. | |
| 2020/0195696 A1* | 6/2020 | Seed | H04L 65/1073 |

FOREIGN PATENT DOCUMENTS

| | | |
|---|---|---|
| CN | 102882972 A | 1/2013 |
| CN | 103327083 A | 9/2013 |
| CN | 103384993 A | 11/2013 |
| CN | 104753930 A | 7/2015 |
| CN | 105163414 A | 12/2015 |
| CN | 105763658 A | 7/2016 |
| CN | 106453675 A | 2/2017 |
| CN | 106487922 A | 3/2017 |
| CN | 107249209 A | 10/2017 |
| EP | 3322156 B1 | 5/2018 |
| JP | 2004220240 A | 8/2004 |
| JP | 2016143140 A | 8/2016 |
| JP | 2017041697 A | 2/2017 |
| WO | 2006090465 A1 | 8/2006 |
| WO | 2006121161 A1 | 11/2006 |
| WO | 2017126282 A1 | 7/2017 |

OTHER PUBLICATIONS

Glória, André, Francisco Cercas, and Nuno Souto. "Design and implementation of an IoT gateway to create smart environments." Procedia Computer Science 109 (2017): 568-575. (Year: 2017).*

Hosek, Jiri, et al. "IP home gateway as universal multi-purpose enabler for smart home services." e & i Elektrotechnik und Informationstechnik 131.4-5 (2014): 123-128. (Year: 2014).*

J. Zhao, X. Zhang, X. Wang, Y. Deng and X. Fu, "Exploiting graphics processors for high-performance IP lookup in software routers," 2011 Proceedings IEEE INFOCOM, 2011, pp. 301-305, doi: 10.1109/INFCOM.2011.5935144. (Year: 2011).*

Kindberg, "Implementing Physical Hyperlinks Using Ubiquitous Identifier Resolution," T. Kindberg, "Implementing physical hyperlinks using ubiquitous identifier resolution," In Proceedings of the 11th international conference on World Wide Web, pp. 191-199. ACM, 2002, pp. 1-11.

Mealling, "Dynamic Delegation Discovery System (DDDS) Part Four: The Uniform Resource Identifiers (URI)," No. RFC 3404, Oct. 2002, pp. 1-18.

Wikipedia, "Domain Name System," Wikipedia, Retrieved from Internet using: https://en.wikipedia.org/wiki/Domain_Name_System, Sep. 20, 2017, pp. 1-20.

Ramachandran et al.."Accessing Gateway Management Console", U.S. Appl. No. 15/809,310, filed Nov. 10, 2017.

Ramachandran et al.."Accessing Gateway Management Console", U.S. Appl. No. 15/809,333, filed Nov. 10, 2017.

International Search Report; International Application No. PCT/IB2018/058693; International Filing Date: Nov. 6, 2018; dated Jan. 30, 2019; 9 pages.

List of IBM Patents or Patent Applications Treated as Related; (Appendix P), Filed Nov. 10, 2017; 2 pages.

International Search Report; International Application No. 2018800722409;International Filing Date: Nov. 6, 2018; dated Oct. 9, 2021; 9 pages.

International Search Report; International Application No. 201880072259.3; International Filing Date: Nov. 6, 2018; dated Feb. 25, 2022; 9 pages.

Notice of Allowance issued in Japanese Application No. 2020-521876; dated Mar. 30, 2022 (2 pages).

Office Action issued in Japanese Application No. 2020-522660; dated Mar. 30, 2022 (5 pages).

Office Action issued in Japanese Application No. 2020-523013; dated Mar. 10, 2022 (3 pages).

Office Action received for International Application No. 201880072240.9 ; dated Apr. 21, 2022 ; 7 pages.

* cited by examiner

ACCESSING GATEWAY MANAGEMENT CONSOLE

BACKGROUND

The present invention generally relates to an improvement to a computer system, particularly a gateway used in an Internet of Things (IoT) setting by facilitating accessing a management console of the gateway.

As IoT grows and numerous devices are connected to one or more IoT cloud servers, the functionality of an IoT gateway gains further importance. An IoT gateway communicates data between the cloud servers and multiple endpoint devices in the IoT setting. For example, the gateway aggregates sensor data, translates between sensor protocols, processes sensor data before sending it onward and more to the server(s). With scores of protocols, connectivity models and energy profiles and the highly dispersed nature of IoT systems, gateways manage and control these complex environments. IoT gateways perform several critical functions such as device connectivity, protocol translation, data filtering and processing, security, updating, management and more. In one or more examples, IoT gateways also operate as platforms for application code that processes data and becomes an intelligent part of a device-enabled system. IoT gateways are considered to be at the intersection of edge systems—devices, controllers and sensors—and the cloud. Thus, managing the IoT gateway itself is a critical aspect of managing the IoT setup. The management of the IoT gateway is performed using a management console.

SUMMARY

According to one or more embodiments, an example computer implemented method for configuring a gateway in an internet of things (IoT) system includes receiving, by a gateway resolver, a request to access a management console of the IoT system, the request including access information associated with the gateway of the IoT system, the request being sent by an administration device. The method further includes determining, by the gateway resolver, an IP address of the gateway based on the access information. The method further includes obtaining, by the gateway resolver, a management console URL based on the IP address. The method further includes redirecting, by the gateway resolver, the administration device to the management console URL in response to the request.

According to one or more embodiments, an example system includes a memory device, and a processor coupled to the memory device, the processor resolves access information for a gateway in an internet of things (IoT) system. The processor performs receiving a request to access a management console of the IoT system, the request including access information associated with the gateway of the IoT system, the request being sent by an administration device. The processor further performs determining an IP address of the gateway based on the access information. The processor further performs obtaining a management console URL based on the IP address. The processor further performs redirecting the administration device to the management console URL in response to the request.

According to one or more embodiments, a computer program product including a computer readable storage medium having program instructions embodied therewith, the program instructions executable by a processor to cause the processor to resolve access information for a gateway in an internet of things (IoT) system. The processor performs receiving a request to access a management console of the IoT system, the request including access information associated with the gateway of the IoT system, the request being sent by an administration device. The processor further performs determining an IP address of the gateway based on the access information. The processor further performs obtaining a management console URL based on the IP address. The processor further performs redirecting the administration device to the management console URL in response to the request.

According to one or more embodiments, an example gateway resolver apparatus includes a data repository to store a mapping between gateway identifiers and corresponding gateway IP addresses. The gateway resolver further includes a processor that receives a gateway resolution request including a gateway identifier, the gateway resolution request received from an administration device. The processor further determines the gateway IP address corresponding to the gateway identifier using the data repository. The processor further generates a URL using the gateway IP address, the URL providing an access location to a management console of a gateway associated with the gateway identifier, and sends the URL to the administration device.

According to one or more embodiments, an example method for resolving access information for a gateway in an internet of things (IoT) system includes scanning, by a gateway administration device, a quick-response code associated with a gateway, the quick-response code including a gateway identifier and a first URL of a gateway resolver. The method further includes, in response, sending, by the administration device, to the gateway resolver via the first URL, a request to resolve an IP address of the gateway, the request including the gateway identifier. The method further includes determining, by the gateway resolver, the IP address corresponding to the gateway identifier using a data repository. The method further includes generating, by the gateway resolver, a second URL using the IP address, the second URL providing an access location to a management console of the gateway associated with the gateway identifier. The method further includes receiving, by the administration device, the second URL from the gateway resolver. The method further includes adjusting, by the administration device, a setting of the gateway via the management console.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
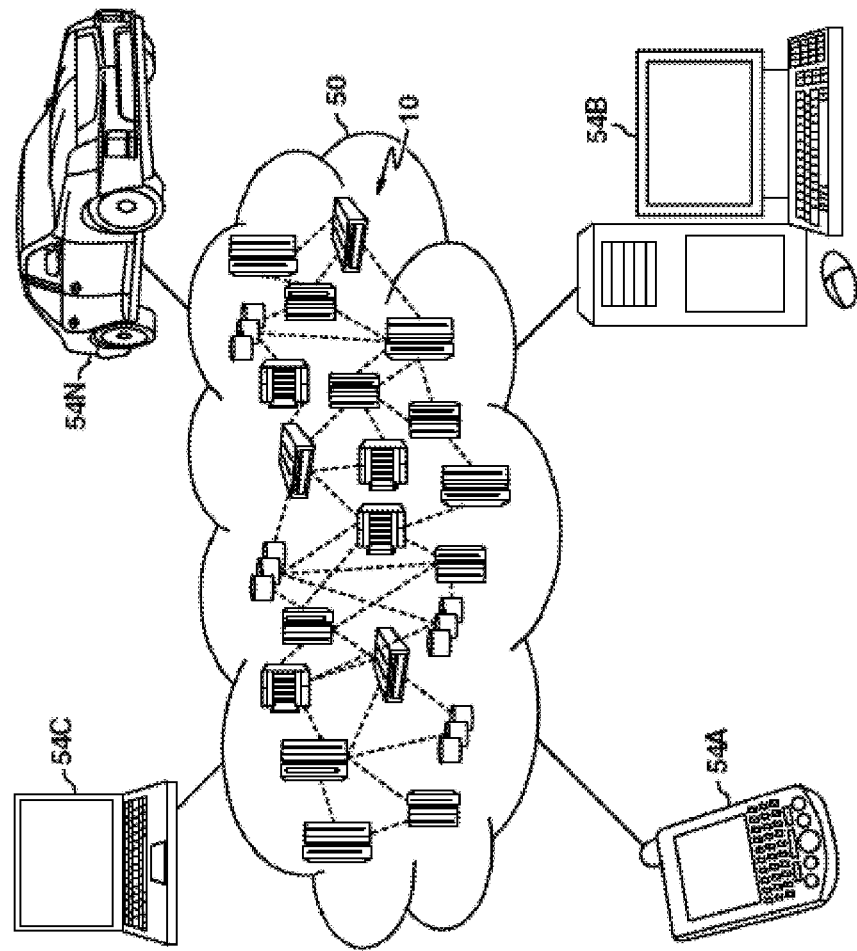
FIG. 1 depicts a cloud computing environment according to an embodiment of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The technical solutions described herein facilitate accessing an IoT gateway management, such as a user-interface (UI) console, particularly in cases where the IoT gateway is not physically accessible. For example, the IoT gateway may be a relatively small device such as a single board computer, like a RASPBERRY PI™, or any other such device. Typically, a software, such as an operating system (OS) of the gateway provides the UI, such as a web-UI to perform management tasks, such as IoT device initial configuration(s), and setting up connections between the gateway and IoT cloud server(s). To access the gateway management UI, an output device, such as a computer monitor, and an input device, such as a keyboard and/or mouse are directly plugged into the gateway, for logging into the gateway OS, and operating the management UI of the gateway.

However, because of the small size, or for any other reason, the gateway may be placed in a location that is not physically accessible for connecting other devices physically, using a physical port of the gateway or plugging a device connector into the gateway, or in any other such physical manner. Alternatively, or in addition, the gateway may not have a port for physical connections with other devices that are external to the gateway. Thus, a technical challenge exists of accessing the management console of the gateway that is physically inaccessible for plugging I/O devices. The technical solutions described herein address the technical challenge by using a Uniform Resource Locator (URL) resolver server. Thus, the technical solutions described herein facilitate accessing a management console of an IoT gateway that is physically inaccessible, thus improving the IoT systems by facilitating the use of smaller and cheaper devices as IoT gateways. The smaller devices further improve the efficiency of the IoT systems, because such devices without providing the physical pluggable ports may use lesser power. Further, in one or more examples, the technical solutions further reduce costs of the IoT systems by not requiring to use dedicated I/O devices for the IoT gateway.

The technical solutions described herein may be implemented using cloud computing in one or more examples. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
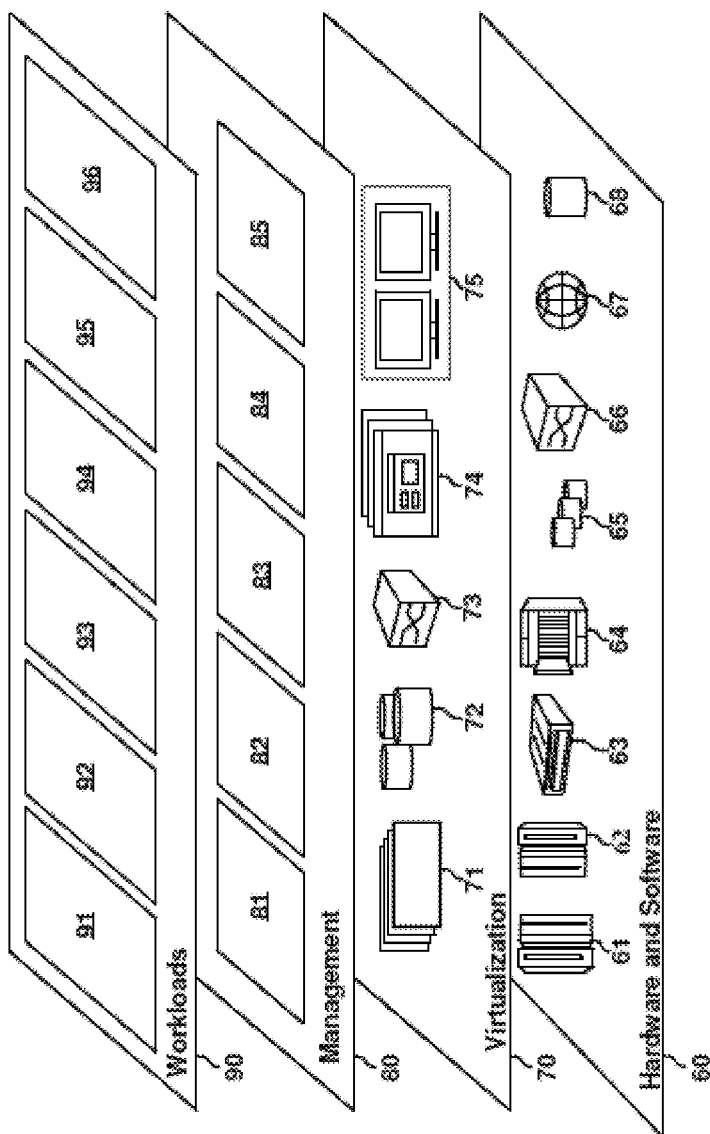
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and gateway URL resolving 96.

Figure 3:
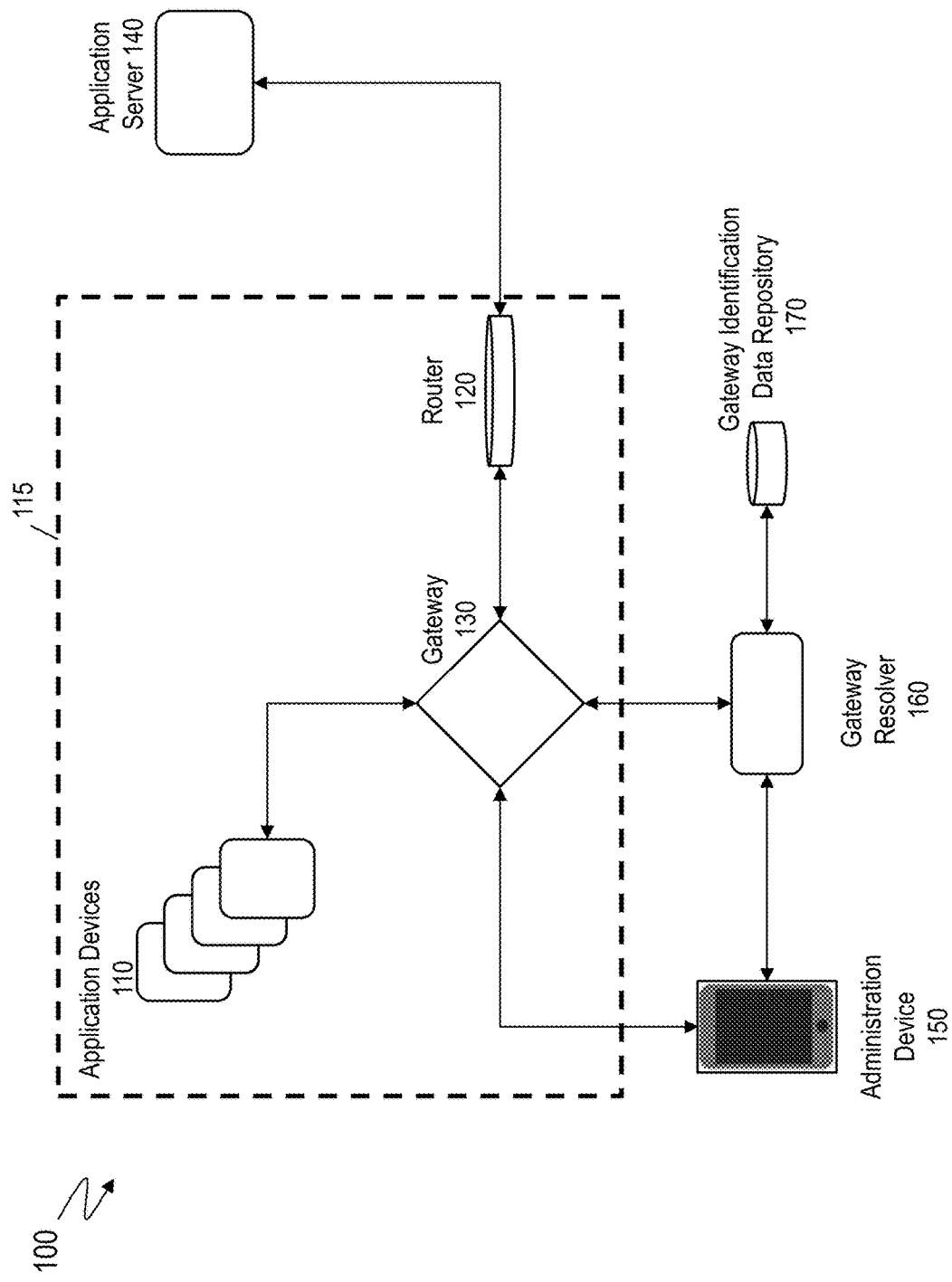
FIG. 3 depicts an example system for accessing a gateway management console of a gateway in an IoT system according to one or more embodiments.

FIG. 3 depicts an example system 100 for accessing an IoT gateway management console according to one or more embodiments of the present invention. The system includes, among other components, one or more application devices 110, a router 120, a gateway 130, an application server 140, an administration device 150, a gateway resolver 160, and a gateway identification data repository 170.

The application devices 110 and the application server 140, together, implement an IoT based system/application. The application devices 110 send/receive data to/from the application server 140 for implementing the IoT based system. The IoT system may be any system/application such as monitoring/controlling one or more parameters by the application devices 110 using one or more analysis performed by the application server 140. The application devices 110 may be also referred to as IoT devices, and may include devices such as sensors, sensor controllers, and the like, for example, thermostats, security systems, home automation devices, production line automation sensors, warehouse automation systems, autonomous vehicle sensor systems, or any other devices that are used in an IoT based system. It should be noted that the examples of the application devices 110 listed above are just a few of various possible application devices 110 that may be used in other embodiments.

The application server 140 is a computer server that receives the data being monitored by the application devices 110, analyzes the data, and sends one or more adjustments to be made by the application devices 110. For example, in case the IoT system is a temperature adjustment system, the application server 140, based on the analysis of the data collected by the application devices 110 (for example, a thermostat), causes the application devices 110 to change the settings of an air-conditioning system to cause the temperature being monitored to increase (or decrease). In other examples, the application devices 110 may monitor different parameters and the application server causes the application devices 110 to change such different parameters.

The application devices 110 and the application server 140 communicate with each other via one or more network connectivity devices, such as the router 120 and the gateway 130, among others. The router 120 facilitates communication between the gateway 130 and the application server 140, the communication being performed using the Internet, in one or more examples. In one or more examples, the gateway 130 and the application devices 110 may be part of a private network, such as a local area network (LAN), wide area network (WAN), or the like, with the gateway 130 in communication with the router 120 to facilitate communication between the application devices 110, which are within the private network, with the application server 140, which is outside the private network. Alternatively, or in addition, the communication between the application devices 110 and the gateway 130 may be through any wireless technologies, such as LAN, WAN, BLUETOOTH™, ZIGBEE™, Z-WAVE™, etc., or through wires directly. In one or more examples, the gateway 130 and the router 120 may be part of the same device, although they are illustrated as distinct devices in FIG. 3.

In one or more examples, the gateway 130 facilitates the communication between the application devices 110 and the application server 140 by converting the data from a format of the communication source (application devices 110/application server) 140 to a format of the communication destination (application devices 110/application server).

It should be noted that, in one or more examples, the gateway 130 may operate as a gateway for two or more IoT systems. For example, the application devices 110 may include a subset of application devices 110 that communicate with a first application server 140, for example, to monitor/control temperature. Concurrently, another subset of the application devices 110 communicates with a second application server 140, via the gateway 130, for monitoring/ controlling security, for example by detecting motion. It should be noted that examples other than those described herein are possible.

Further yet, the gateway 130 facilitates setting up the one or more IoT systems being implemented using the application devices 110, for example by configuring the application devices 110. For example, configuring the application devices 110 may include setting one or more operating parameters, identifiers, login information, and the like, for the application devices 110. Alternatively, or in addition, the gateway 130 downloads and installs/updates firmware on the application devices 110, in response to command(s) received from the application server 140.

In one or more examples, the gateway 130 provides a management console for an administrator to setup the IoT system, including the configuring the application devices 110. The administrator performs management tasks, such as device initial configuration, and setting up connections between the gateway 130 and the application server 140 via the management console. The administrator also configures the gateway itself via the management console.

As described earlier, typically to access the management console, a computer monitor, a keyboard, a mouse, and other such I/O devices are directly plugged into the gateway 130. The I/O devices are then used to login to the gateway OS. In one or more examples, the management console of the gateway 130 may be web-based, and accordingly, an IP address for the gateway 130 is determined and then the management console for the gateway 130 is launched using the IP address. The management console may be accessed using a URL that is based on the IP address, for example, that includes the IP address. The management console may be launched either from the gateway 130 itself or from a remote third device, in one or more examples. However, this is not a desirable process to access the gateway's management console because under some circumstances, as described herein, the gateway 130 is physically inaccessible. Alternatively, or in addition, even if the gateway 130 is accessible, use of the I/O devices, such as a screen or keyboard add cost for the gateway's deployment. Alternatively, or in addition, the gateway 130 may not include pluggable ports, for example, to prevent outside elements to enter the gateway 130, for example in a biomedical laboratory to prevent bio-hazardous material, or any other material from entering the gateway 130, or in an industrial setting to prevent dust, moisture, fine particles, or any other material from entering the gateway 130. The technical solutions described herein address such technical challenges.

For example, as depicted in FIG. 3, the administrative device 150 facilitates accessing the management console of the gateway 130, without physically plugging into the gateway 130. In one or more examples, the network 115 may include the gateway 130 and the application devices 110. Accordingly, the administration device 150 may not be able to directly communicate with the application devices 110 to set one or more operating parameters of the application devices 110. The administrative device 150 wirelessly determines a unique identifier associated with the gateway 130 and determines the IP address of the gateway 130 using a gateway resolver 160.

The gateway resolver 160 is a computer, such as a server. The gateway resolver 160 receives a request from the administrative device 150 to provide an IP address for the gateway 130 based on the unique identifier of the gateway 130. The gateway resolver 160 determines the IP address corresponding to the unique identifier using the gateway identification data repository 170.

The gateway identification data repository 170 includes a data structure, such as a table, that maintains a mapping between the IP address and the unique identifier of the gateway. It should be noted that the gateway identification data repository 170 includes such mapping for multiple gateways, which may be accessed to determine the IP address of one of the gateways via the request to the gateway resolver 160. It should be noted that although the gateway identification data repository 170 and the gateway resolver 160 are depicted as separate devices in FIG. 3, in one or more examples, the two may be part of a single system/device. The administrative device 150 and the gateway resolver 160, in one or more examples, communicate via a communication network, such as the Internet, where the administrative device 150 knows the access parameters, such as an IP address, URL, or other such access parameters of the gateway resolver 160.

In one or more examples, the gateway resolver 160 provides the corresponding IP address of the unique identifier of the gateway 130 only if the administrative device 150 is a trusted device. For example, the administrative device 150 may be a trusted device if credentials associated with the administrative device 150 are known or authenticated by the gateway resolver 160. For example, the credentials may include a unique identifier of the administrative device 150, such as a MAC address, a serial number, a phone number, or other such parameters. Alternatively, or in addition, the credentials may include a username, a password, a fingerprint, a face, or other biometric-type identifiers, associated with the administrative device 150.

Upon validation of such credentials, or authentication using the credentials, the gateway resolver 160 may provide the IP address of the gateway 130 to the administrative device 150. The administrative device 150 further uses the IP address to access the management console of the gateway 130, for example, by generating the URL or other access location for the management console based on the IP address. Alternatively, in one or more examples, the gateway resolver 160 determines the URL or access location for the management console of the gateway 130 and sends the access location to the administrative device 150. Alternatively, in one or more examples, the gateway resolver 160, upon determination of the IP address, requests the gateway 130 to generate and/or provide the access location of the management console and transfers the access location received from the gateway 130 to the administrative device 150.

The system 100 thus facilitates accessing the management console of the gateway 130 in a wireless manner, without using plugged into the gateway 130, the management console being used to configure the IoT setup.

Figure 4:
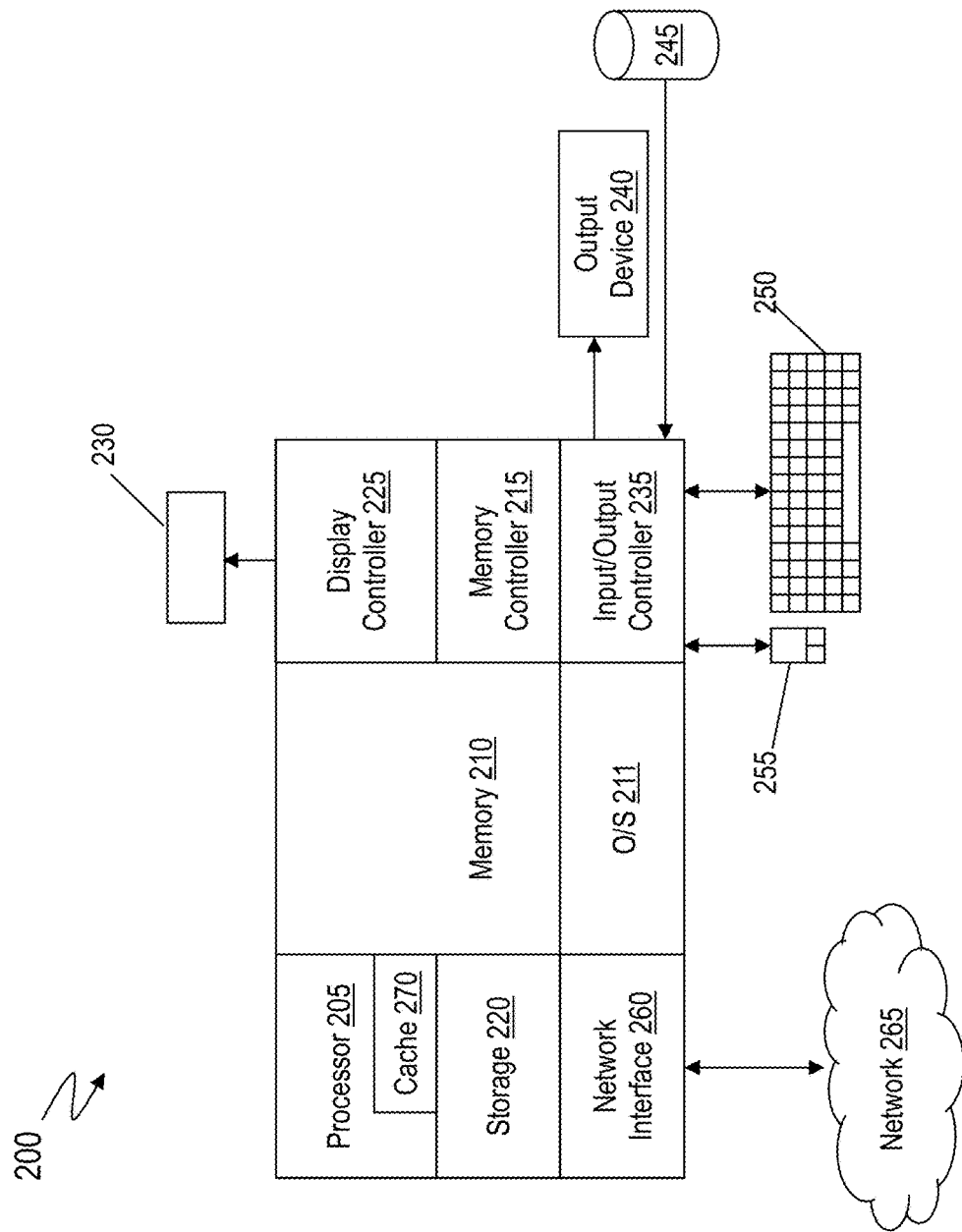
FIG. 4 illustrates an example system according to one or more embodiments.

FIG. 4 illustrates an example system 200 according to one or more embodiments. The system 200 may be a communication apparatus, such as a computer. For example, the system 200 may be a desktop computer, a tablet computer, a laptop computer, a phone, such as a smartphone, a server computer, or any other device that communicates via a network 265. The system 200 includes hardware, such as electronic circuitry. In one or more examples, the system 200 is any one or more of the devices depicted in FIG. 3, such as the gateway 130, the application server 140, the administrative device 150, the gateway resolver 160, or any one or more of the application devices 110.

The system 200 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors, indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the system 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The system 200 may further include a display controller 225 coupled to a user interface or display 230. In some embodiments, the display 230 may be an LCD screen. In other embodiments, the display 230 may include a plurality of LED status lights. In some embodiments, the system 200 may further include a network interface 260 for coupling to a network 265. The network 265 may be an IP-based network for communication between the system 200 and an external server, client and the like via a broadband connection. In an embodiment, the network 265 may be a satellite network. The network 265 transmits and receives data between the system 200 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 5:
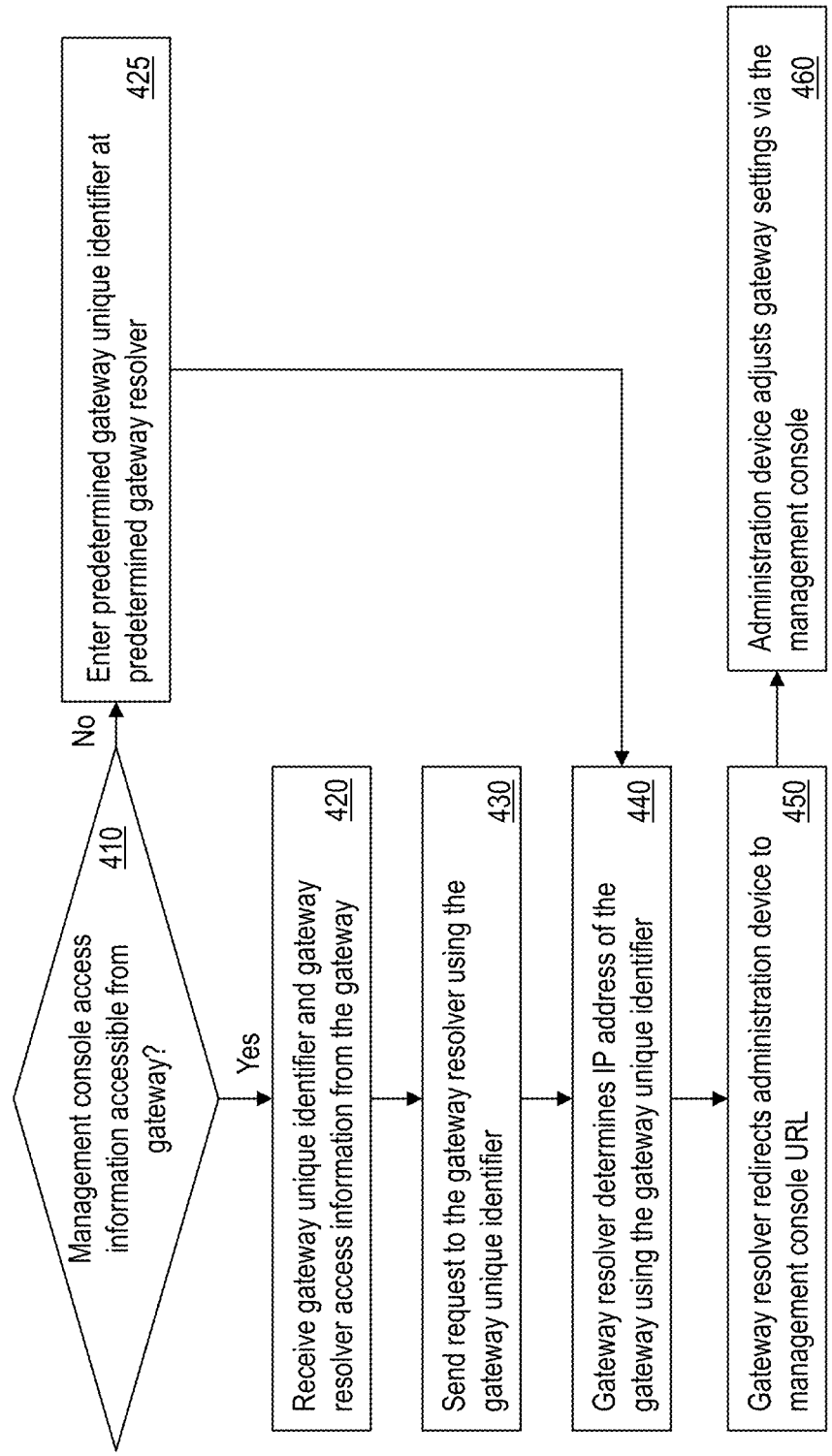
FIG. 5 depicts a flowchart of an example method for accessing a management console of an IoT gateway according to one or more embodiments.

FIG. 5 depicts a flowchart of an example method for accessing a management console of an IoT gateway according to one or more embodiments. The method may be implemented using the system 100. The method includes the administration device 150 determining if management console access information for the gateway device 130 is accessible, at 410. For example, the gateway device 130 may include a radio frequency identification (RFID) device (not shown) that outputs the access information for the gateway device 130. Alternatively, or in addition, the access information may be available from the gateway device 130 may be accessible via near field communication protocols, such as BLUETOOTH LOW ENERGY (BLE™), ZIGBEE™, Z WAVE™, or any other such near field communication. Alternatively, or in addition, the access information may be available from the gateway device 130 via a wireless communication protocol, such as BLUETOOTH™, WIFI™, or the like. Alternatively, or in addition, the access information may be available from the gateway device 130 in the form of a code, text, image, or any other form that can be captured by the administration device 150. For example, the access information may be part of a barcode, quick response (QR) code or the like that is posted, for example as a sticker, on the gateway device 130, or in a predetermined location associated with the gateway device 130. It should be noted that above are few examples of providing the access information by the gateway device 130 in a wireless and unpluggable manner, and in other embodiments, other techniques may be used.

If the access information is accessible, the administration device 150 receives the access information from the gateway device 130, at 420. In one or more examples, the administration device 150 may capture the access information from the gateway device 130 using a camera, scanner, or other such input device. Alternatively, or in addition, the administration device 150 captures the access information from the gateway device 130 in one or more wireless manner, such as those described above.

The access information includes at least two parameters, a unique identifier (gateway ID) of the gateway device 130, and an access location of the gateway resolver 160. For example, if the access information is a QR code, the QR code is composed in a web site URL format, which points to the gateway resolver 160, and the gateway ID is added as part of the URL in a way that the gateway resolver 160 can retrieve the gateway ID from the access information. For example, the gateway ID is part of the access information as a predetermined parameter value that the gateway resolver 160 is able to retrieve upon receiving a request from the administration device 150. That is because the method further includes, sending a request to the gateway resolver 160 using the access information, at 430. If the access information is not accessible from the gateway device 130, the administration device 150 sends the request to the gateway resolver 160 using a predetermined location of the gateway resolver 160, such as a URL access location, or an application programming interface (API) call or the like, at 425. The administration device 150 may provide the gateway ID as a parameter of the request even, in this case, the gateway ID being manually entered by an administrator or another user of the administration device 150.

The gateway ID may be a unique identifier of the gateway device 130, for example, a MAC address, a serial number, a unique string of digital characters, or any other unique identifier for the gateway device 130.

The gateway resolver 160, upon receiving the request from the administration device 150, determines an IP address of the gateway device 130 based on the gateway ID, at 440. The gateway resolver 160, in one or more examples, uses the mapping in the gateway identification data repository 170 to determine the IP address of the gateway device 130 using the gateway ID retrieved from the request.

The method further includes redirecting the administration device 150 to a URL of the management console of the gateway device 130 by the gateway resolver 160, at 450. In one or more examples, the gateway resolver composes the management console's URL and then redirects the administration device 150 to the URL. The URL may be composed using a predetermined URL format that the gateway device 130 uses to launch the management console, for example via a web-based UI. Alternatively, or in addition, the gateway resolver 160 requests the gateway device 130 for the URL of the management console using the IP address of the gateway device 130, and redirects the administration device 150 to the URL from the gateway device 130.

Upon being redirected, the administration device 150 uses the management console to adjust settings of the gateway device 130, at 460. The settings adjusted include those for operations of the gateway device 130 and/or the application device 110, and/or the operation of the IoT system that includes the application devices 110 and the application server 140.

In an example scenario, to access the gateway management console, an administration device 150, such as a mobile device scans a website (URL) QR code attached to the gateway device 130. The QR code contains URL of the gateway resolver 160 and the gateway's unique ID. The administration device 150 upon scanning the QR code sends a request, such as an HTTP request, to the gateway resolver 160, which retrieves the gateway unique ID from the request URL, and determines the gateway's IP address from the data repository 170 using this unique ID. The gateway resolver 160 (or the gateway device 130) composes the management console URL and redirects the administration device 150 to management console via the console URL.

Figure 6:
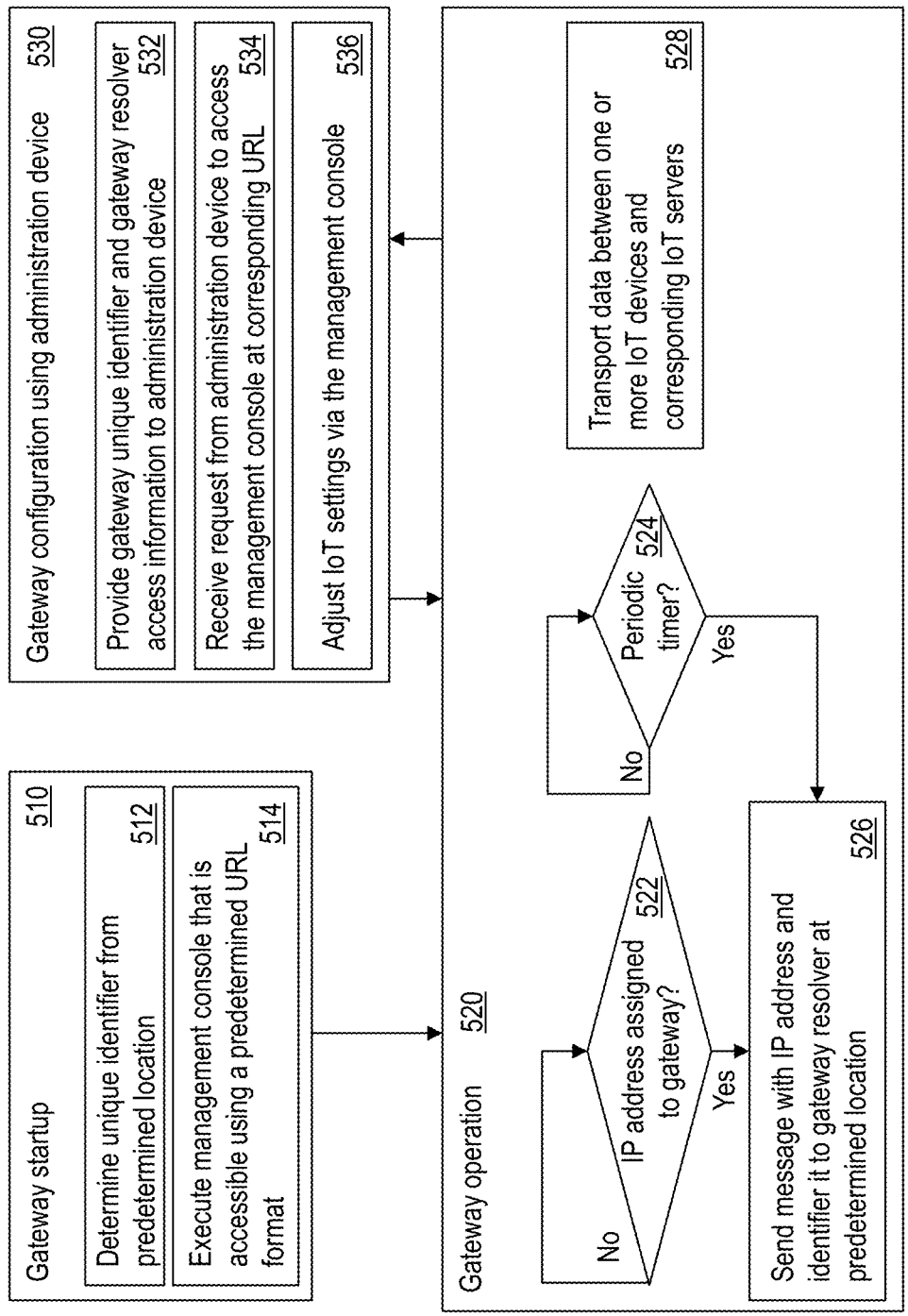
FIG. 6 depicts a flowchart of an example method for configuring a gateway in an IoT system, according to one or more embodiments.

FIG. 6 depicts a flowchart of an example method for configuring a gateway in an IoT system, according to one or more embodiments. The method includes starting up the gateway device 130, at 510. The gateway device 130 is connected to the network 265, either by network cable or by wireless and powered on, for example. Upon startup, the gateway device 130 determines the unique identifier assigned to the gateway device 130, at 512. For example, the unique identifier may be determined by reading the gateway ID from a predetermined location, such as a memory address, a parameter value (e.g.: serial number, MAC address), or the like. The unique identifier can be any string or the like, that is unique within all deployed gateways.

Further, the gateway device 130 executes the management console and makes it accessible using a URL that uses a predetermined URL format, at 514. For example, the URL format may be: https://<Gateway IP address>/gateway-management. It should be noted that in other embodiments, the URL format may be different than the earlier example. The gateway device 130 begins typical operation, at 520, which includes transporting data between the application devices 110 and the corresponding application server 140, at 528.

In addition, the method includes, executing an IP reporting code on the gateway device 130, which sends an IP address of the gateway device 130 to the gateway resolver 160, at 526. In one or more examples, the access location of the gateway resolver 160 is predetermined and included in the gateway as a preset, such as at a predetermined memory address or as a parameter value, for example in the form of an IP address of the gateway resolver 160. The IP reporting code accesses the access location of the gateway resolver 160 and sends the IP address of the gateway device 130 along with the unique identifier of the gateway 130 to the gateway resolver 160, at 526. For example, the gateway device 130 sends a message in a format, such as {"UniqueID":"6c4008ae8786","IP":"192.168.0.28"}. It should be noted that the format used may be different in other embodiments. The gateway resolver 160 updates the mapping in the data repository 170 between the gateway identifier and the gateway IP address.

In one or more examples, the gateway device 130 reports the IP address to the gateway resolver 160 every time an IP address is assigned to the gateway device 130, at 522. For example, when the gateway device 130 is powered on and connected to the network 265, upon being assigned an IP address, the gateway device 130 reports the IP address to the gateway resolver 160. Further, if the network 265 is reset and the IP address of the gateway device 130 is changed, the updated IP address is reported to the gateway resolver 160 along with the gateway ID as described herein. Alternatively, or in addition, the gateway device 130 sends a periodic message to the gateway resolver with the gateway ID and gateway IP address, according to a predetermined timer, at 524. The gateway identification data repository 170 thus has the latest IP address of the gateway device 130 mapped to the gateway ID of the gateway device 130.

Further, the method includes configuring the gateway device 130 using the administration device 150, at 530. The configuring includes providing the management console access information to the administration device 150, at 532. As described herein, the access information is provided in a wireless manner. The access information includes at least the gateway ID and the gateway resolver access location, such as a URL, for example in the form of a QR code or the like.

The administration device 150 resolves the management console URL via the gateway resolver 160 as described herein using the gateway ID.

The method further includes receiving a request from the administration device 150 to access the management console at the URL associated with the management console, at 534. As described herein, the URL uses a predetermined format and may be composed by the gateway resolver 160, or is provided by the gateway device 130 to the gateway resolver 160, which redirects the administration device 150 to the management console URL.

The method further includes adjusting the settings of the gateway device 130 and/or the IoT settings, for example, of the application devices 110, as per instructions received via the management console, at 536.

The method facilitates the gateway device 130 to keep the gateway resolver apprised of any changes to the gateway's IP address so that a user/administrator can access the management console of the gateway device 130 in a wireless manner and configure the gateway device 130 to operate in the IoT system. It should be noted that the management console also facilitates adjusting settings of the IoT system, such as operating parameters of the application devices 110. For example, the management console may facilitate changing communication protocols, application server(s), measurements captured, the frequency of measurements, or any other such operating parameters of the application devices 110.

Figure 7:
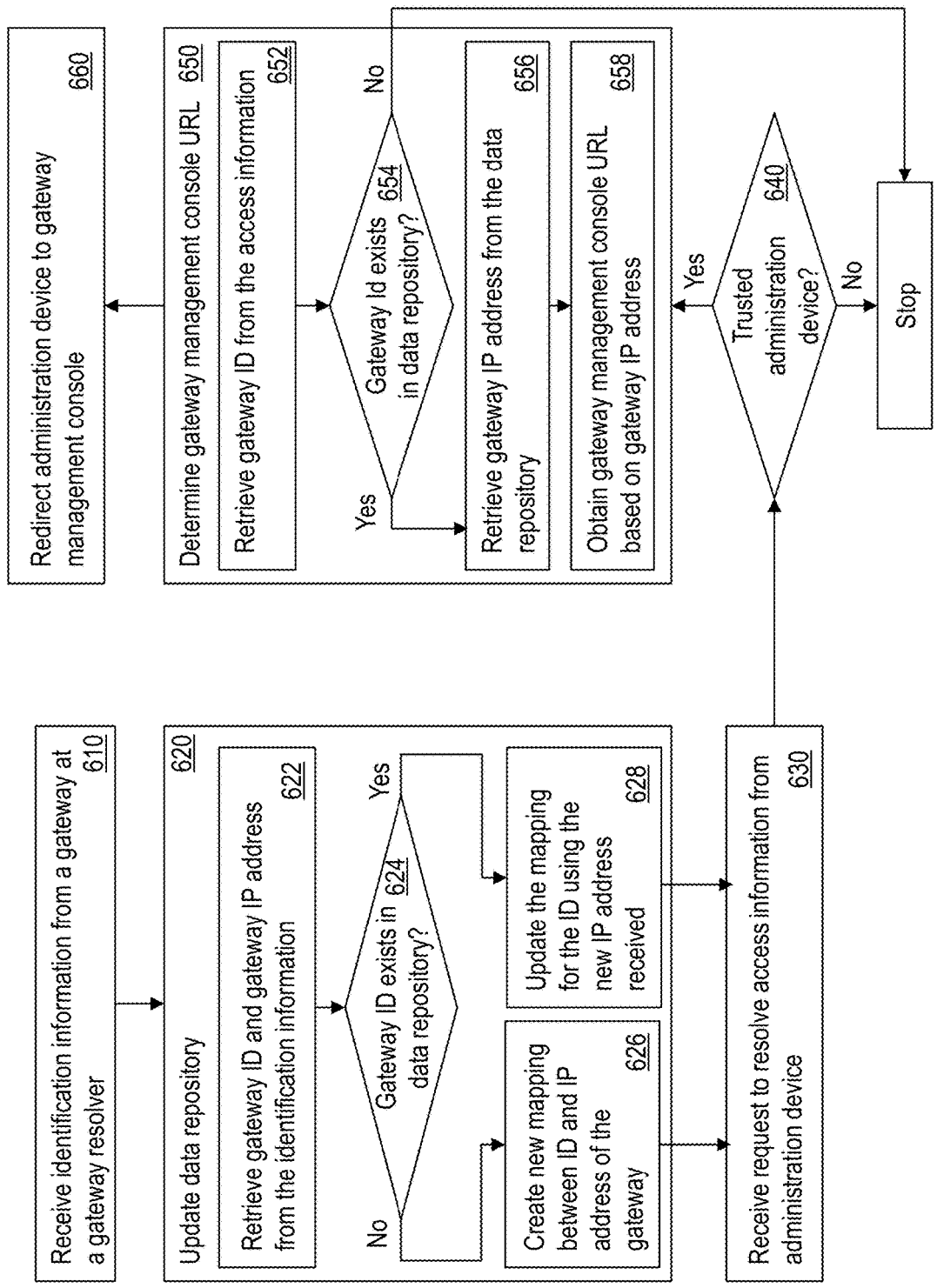
FIG. 7 depicts a flowchart of an example method for accessing a management console of a gateway in an IoT system according to one or more embodiments.

FIG. 7 depicts a flowchart of an example method for accessing a management console of a gateway in an IoT system according to one or more embodiments. The method includes receiving, by the gateway resolver 160, identification information from the gateway device 130, at 610. The identification information includes the gateway ID and the IP address of the gateway device 130, as described herein. The identification information may be received when the gateway device 130 starts up, experiences a network reset, and/or is assigned an updated IP address for any other reason.

The method further includes updating the data repository 170 by the gateway resolver 160, at 620. The update includes retrieving the gateway ID and the gateway IP address from the identification information received, at 622. In one or more examples, the two parameters are at the predetermined location or are predetermined portions of the identification information received. The gateway resolver 160 checks if the gateway ID already exists in the data repository 170 that maintains a mapping between gateway IDs and gateway IP addresses, at 624. If the gateway ID does not exist in the data repository 170, a new entry is created in the mapping, the entry maps the gateway ID and the gateway IP address received in the identification information, at 626. If the gateway ID already exists in an entry in the data repository 170, the entry is updated with the gateway IP address received in the identification information, at 628. The data repository 170 thus contains the latest gateway IP address.

Further, the method includes receiving, by the gateway resolver 160, from the administration device 150, a request to resolve a management access information, at 630. As described herein, the administration device 150 may send the request in response to receiving the access information from the gateway device 130. Alternatively, or in addition, the administration device 150 sends the request with manual entry for the gateway ID.

The gateway resolver 160, in one or more examples, authenticates that the request is received from a trusted administration device 150, at 640. For example, the authentication may include ensuring that the administration device 150 is one from a predetermined list of administration devices. For example, the access information received from the administration device 150 also includes a validation information for the administration device 150. For example, the validation information includes an identification of the administration devices, such as a MAC address, a serial number or the like. Alternatively, or in addition, the validation information includes a trust certification, such as a digital certificate using one or more validation techniques such as a public key certificate, or any other security technique. Alternatively, or in addition, the validation information includes a username-password combination, biometric information, or any other such data associated with the user of the administration device 150 sending the request to the gateway resolver 160.

If the administration device 150 is not a trusted device, the gateway resolver does not proceed with the method, and the administration device 150 is prevented from accessing the management console of the gateway device 130. If the administration device 150 is a trusted device, the gateway resolver 160 determines an access location, such as a URL, of the gateway management console, at 650.

Determining the gateway management console URL includes parsing the access information from the request further to retrieve the gateway ID, at 652. The gateway resolver 160 checks if the data repository 170 includes a mapping entry for the gateway ID, at 654. If an entry does not exist, the gateway resolver 160 indicates an error condition to the administration device 150, at 654. If the mapping entry for the gateway ID is retrieved from the data repository 170, the gateway resolver determines the gateway IP address from the mapping, at 656.

The method further includes obtaining the URL of the gateway device 130 using the gateway IP address from the mapping, at 658. In one or more examples, obtaining the URL includes the gateway resolver 160 composing the URL using a predetermined format for gateway device 130, as described herein. In one or more examples, different gateway devices may use different corresponding predetermined formats. Accordingly, the data repository 170, in one or more examples, may store the predetermined format for the URL creation for respective gateway devices 130 in the mapping entries. Alternatively, the gateway resolver 160 sends a request to the gateway device 130 to provide the predetermined format for the URL composition. Based on the predetermined format for the gateway device 130, the gateway resolver generates the URL for the gateway management console.

Alternatively, in one or more examples, the gateway resolver 160 sends a request to the gateway device 130 using the gateway IP address retrieved from the mapping entry, the request being for the gateway management console URL. In response, the gateway device 130 provides the URL for the gateway management.

The method further includes redirecting the administration device 150 to the gateway management console URL in response to the request for resolving the access information that was sent by the administration device 150, at 660. The administration device 150, upon being redirected to the URL, is able to provide instructions to adjust one or more operating parameters of the gateway device 130, the application devices 110, or other parameters associated with the operation of the IoT system(s) that the application devices 110 are part of.

The technical solutions described herein facilitate accessing a management console of an IoT gateway device that is physically inaccessible via ports or other pluggable hardware. Further, the technical solutions described herein facilitate reducing costs of setting up an IoT based system. The technical solutions described herein improve the IoT based system by facilitating using the gateway being accessible, or without pluggable ports being accessible, which enables using the IoT system in settings with such requirements, such as in the context of biomedical, industrial applications and the like. Further, the technical solutions improve the IoT systems by facilitating a reduction in the size of the gateway, because pluggable ports in the gateway add to the size of the gateway.

The technical solutions described herein further do not use tree structures, that may be used by name servers to resolve a computer's IP address, rather the technical solutions described herein use a gateway resolver, which is a centralized IP service server to resolve a gateway's IP address. A gateway's IP address can be either a fixed IP or a dynamic IP. According to the technical solutions described herein the gateways report their IP addresses periodically, or in response to an event such as a network reset, to the URL resolver service that the gateway resolver operates, so that the latest gateway management console URL can be retrieved. Thus, the technical solutions use an active binding between the gateway identifier and the getaway's management console URL, the binding being unique (1-to-1) and proactive (resource owner, gateway, periodically report is IP to the binding service server.)

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the technical features herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for configuring a gateway in an internet of things (IoT) system, the method comprising:
    receiving, by a gateway resolver and from IP reporting code of the gateway, a unique gateway identifier and a gateway IP address mapped to the unique gateway identifier responsive to a change in the gateway IP address;
    storing, by the gateway resolver, a copy of the unique gateway identifier and the gateway IP address mapped to the unique gateway identifier in a data repository;
    receiving, by the gateway resolver, a request to access a management console of the gateway of the IoT system, the request comprising access information associated with the gateway, the request being sent by an administration device;
    parsing, by the gateway resolver, the access information to retrieve the unique gateway identifier;
    accessing, by the gateway resolver and from the data repository, the gateway IP address for the unique gateway identifier retrieved from the request;
    requesting, by the gateway resolver via the gateway IP address accessed from the data repository, the gateway to provide a predetermined format for management console URLs generated for the gateway;
    generating, by the gateway resolver, a management console URL in the predetermined format based on the gateway IP address; and
    redirecting, by the gateway resolver, the administration device to the management console URL in response to the request to access the management console of the gateway, thereby allowing the administration device to configure one or more settings of the gateway.

2. The method of claim 1, wherein the predetermined URL format is specific to the gateway, the predetermined URL format determined using the unique gateway identifier of the gateway.

3. The method of claim 1, further comprising authenticating the administration device in response to receipt of the request.

4. A system comprising:
    a memory device; and
    a processor coupled to the memory device, the processor configured to resolve access information for a gateway in an internet of things (IoT) system, the processor is configured to perform:
        receiving, from IP reporting code of the gateway, a unique gateway identifier and a gateway IP address mapped to the unique gateway identifier responsive to a change in the gateway IP address;
        storing a copy of the unique gateway identifier and the gateway IP address mapped to the unique gateway identifier in a data repository;
        receiving a request to access a management console of the gateway of the IoT system, the request comprising the access information associated with the gateway, the request being sent by an administration device;
        parsing the access information to retrieve the unique gateway identifier;
        accessing, from the data repository, the gateway IP address for the unique gateway identifier retrieved from the request;
        requesting, via the gateway IP address accessed from the data repository, the gateway to provide a predetermined format for management console URLs generated for the gateway;
        generating a management console URL in the predetermined format based on the gateway IP address; and
        redirecting the administration device to the management console URL in response to the request to access the management console of the gateway, thereby allowing the administration device to configure one or more settings of the gateway.

5. The system of claim 4, wherein the predetermined URL format is specific to the gateway, the predetermined URL format determined using the unique gateway identifier of the gateway.

6. The system of claim 4, wherein the processor is further configured to perform authenticating the administration device in response to receipt of the request.

7. A computer program product comprising a computer readable storage medium having program instructions embodied therewith, the program instructions executable by a processing circuit to cause the processing circuit to resolve access information for a gateway in an internet of things (IoT) system, the processing circuit is configured to perform:
    receiving, from IP reporting code of the gateway, a unique gateway identifier and a gateway IP address mapped to the unique gateway identifier responsive to a change in the gateway IP address;
    storing a copy of the unique gateway identifier and the gateway IP address mapped to the unique gateway identifier in a data repository;
    receiving a request to access a management console of the gateway of the IoT system, the request comprising the access information associated with the gateway, the request being sent by an administration device;
    parsing the access information to retrieve the unique gateway identifier;
    accessing, from the data repository, the gateway IP address for the unique gateway identifier retrieved from the request;
    requesting, via the gateway IP address accessed from the data repository, the gateway to provide a predetermined format for management console URLs generated for the gateway;
    generating a management console URL in the predetermined format based on the gateway IP address; and
    redirecting the administration device to the management console URL in response to the request to access the management console of the gateway, thereby allowing the administration device to configure one or more settings of the gateway.

8. The computer program product of claim 7, wherein the predetermined URL format is specific to the gateway, the predetermined URL format determined using the unique gateway identifier of the gateway.

9. A gateway resolver apparatus comprising:
a data repository configured to store a mapping between gateway identifiers and corresponding gateway IP addresses;
a processor configured to:
receiving, from IP reporting code of the gateway, a unique gateway identifier and a gateway IP address mapped to the unique gateway identifier responsive to a change in the gateway IP address;
storing a copy of the unique gateway identifier and the gateway IP address mapped to the unique gateway identifier in a data repository;
receive a gateway resolution request comprising a unique gateway identifier, the gateway resolution request received from an administration device by scanning a machine readable access code that is attached to the gateway;
parse the gateway resolution request to retrieve the unique gateway identifier;
access, from the data repository, the gateway IP address for the unique gateway identifier from the data repository retrieved from the request;
request, via the gateway IP address accessed from the data repository, the gateway to provide a predetermined format for URLs generated for the gateway;
generate a URL in the predetermined format using the gateway IP address, the URL providing an access location to a management console of a gateway associated with the unique gateway identifier; and
send the URL to the administration device.

10. The gateway resolver apparatus of claim 9, wherein generating the URL comprises using a predetermined URL format specific to the gateway associated with the unique gateway identifier, the predetermined URL format being stored in the data repository.

11. A method for resolving access information for a gateway in an internet of things (IoT) system, the method comprising:
receiving, from a gateway resolver and from IP reporting code of the gateway, a unique gateway identifier and a gateway IP address mapped to the unique gateway identifier responsive to a change in the gateway IP address;
storing, by the gateway resolver, a copy of the unique gateway identifier and the gateway IP address mapped to the unique gateway identifier in a data repository;
scanning, by a gateway administration device, a quick-response code that is affixed on the gateway, the quick-response code comprising a unique gateway identifier and a first URL of the gateway resolver;
in response, sending, by the administration device, to the gateway resolver via the first URL, a request to resolve a gateway IP address of the gateway, the request comprising the gateway identifier;
accessing, by the gateway resolver and at the data repository, the gateway IP address mapped to the unique gateway identifier;
retrieving, by the gateway resolver and from the gateway, via the gateway IP address accessed from the data repository, a predetermined URL format;
generating, by the gateway resolver, a second URL in the predetermined format using the gateway IP address, the second URL providing an access location to a management console of the gateway associated with the unique gateway identifier;
receiving, by the administration device, the second URL from the gateway resolver; and
adjusting, by the administration device, a setting of the gateway via the management console.

12. The method of claim 11, wherein generating the second URL comprises using a predetermined URL format specific to the gateway associated with the unique gateway identifier, the predetermined URL format being stored in the data repository.

13. The method of claim 11, further comprising:
receiving, by the gateway resolver, a periodic identification information from the gateway, the identification information comprising the unique gateway identifier and the gateway IP address of the gateway.

* * * * *